Figure 1:
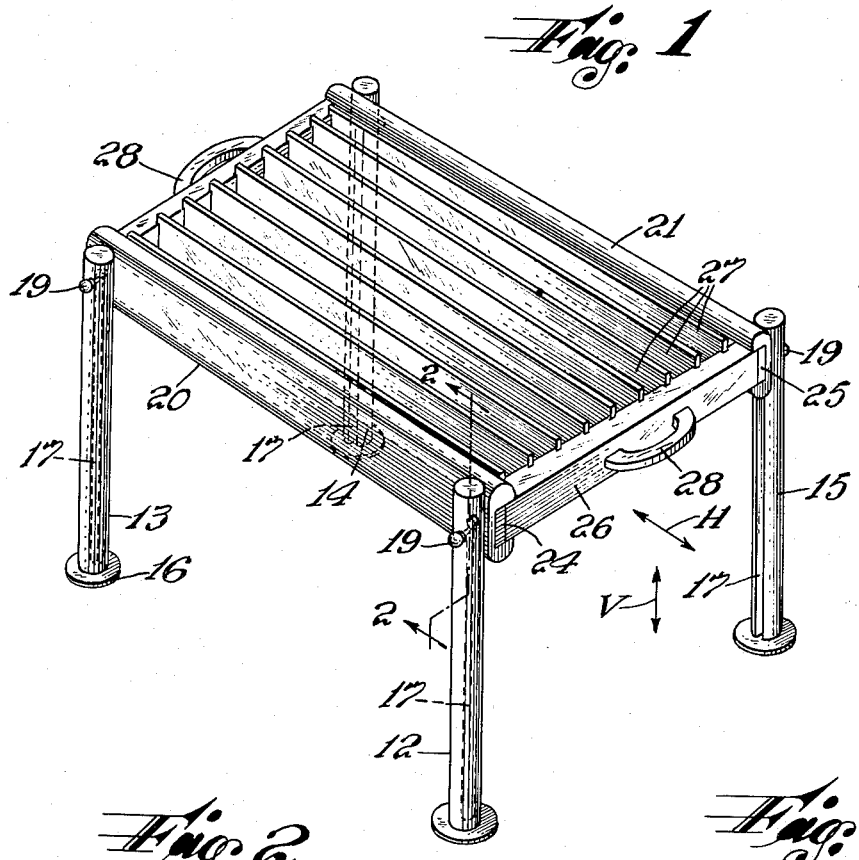

Jan. 17, 1961 J. A. HOOKER 2,968,567
METHOD OF FORMING A FROZEN FOOD PRODUCT
Filed Aug. 16, 1954 2 Sheets-Sheet 1

INVENTOR.
JOHN A. HOOKER
BY
ATTORNEY

Jan. 17, 1961 J. A. HOOKER 2,968,567
METHOD OF FORMING A FROZEN FOOD PRODUCT
Filed Aug. 16, 1954 2 Sheets-Sheet 2
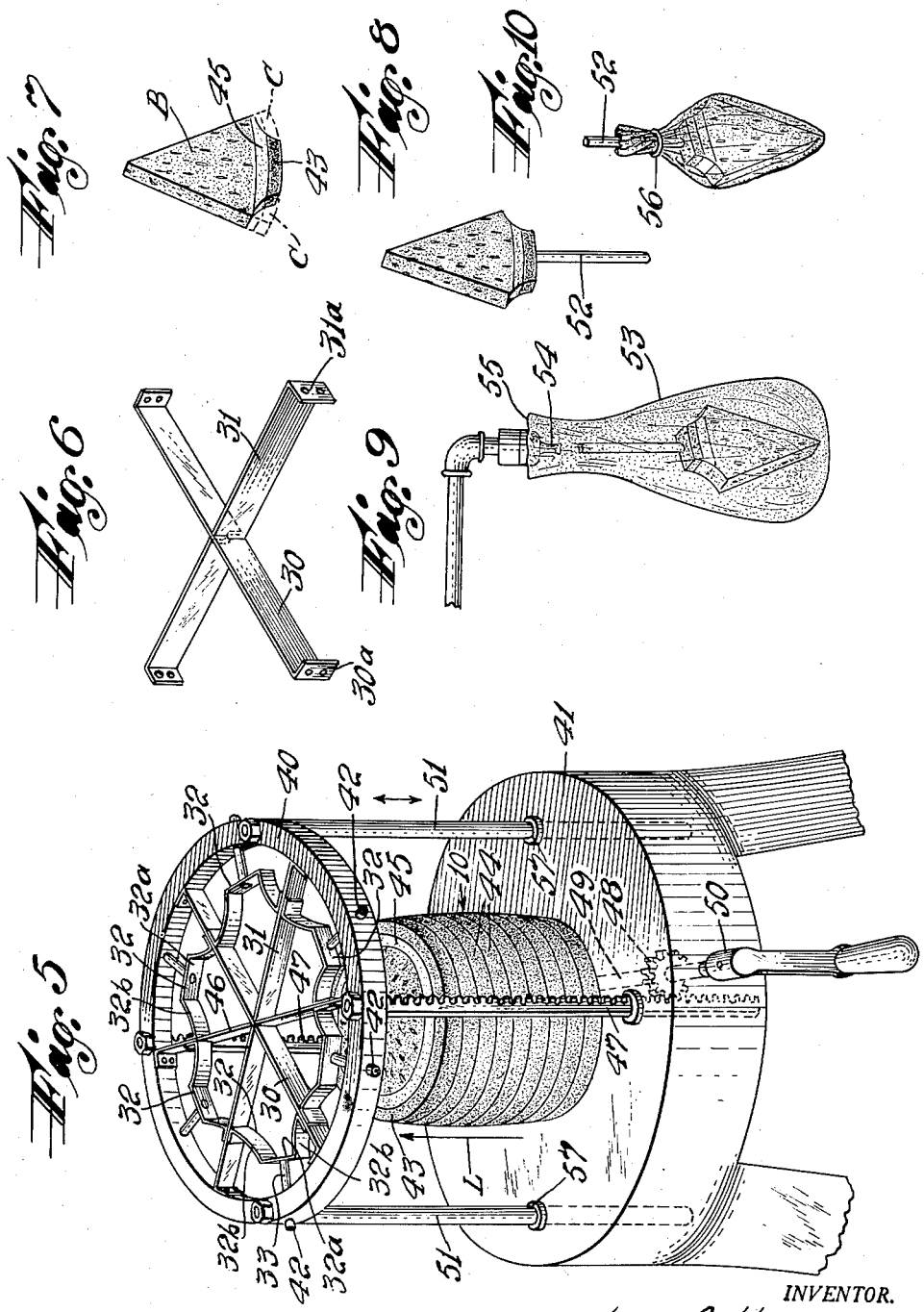
INVENTOR.
JOHN A. HOOKER
BY
ATTORNEY

United States Patent Office 2,968,567
Patented Jan. 17, 1961

2,968,567

METHOD OF FORMING A FROZEN FOOD PRODUCT

John A. Hooker, Kearny, N.J., assignor to Mary Bova, Borough of Deal, Monmouth County, N.J.

Filed Aug. 16, 1954, Ser. No. 450,018

2 Claims. (Cl. 99—193)

This invention comprises a method of and apparatus for forming a frozen fruit product, enabling the utilization of essentially the entire useful portion of the fruit structure by a novel method of cutting the same, below more particularly set forth, and then inserting sticks through the said rind sections of the triangular portions to form a convenient handle or support for the same, placing the same in bags, evacuating the air from said bags, twisting the bags over the handle portions and sealing the twisted portions of the bag onto the handle portions in that position. The thus formed complete article is then placed in a deep freeze unit from which it may be removed preparatory to ultimate consumption.

These and other advantageous objects, which will appear from the drawings and from the description hereinafter, are accomplished by the structure of my invention, of which an embodiment is illustrated in the drawings. It will be apparent, from a consideration of said drawings and the following description, that the invention may be embodied in other forms suggested thereby, and such other forms as come within the scope of the appended claims are to be considered within the scope and purview of the instant invention.

Figure 2:
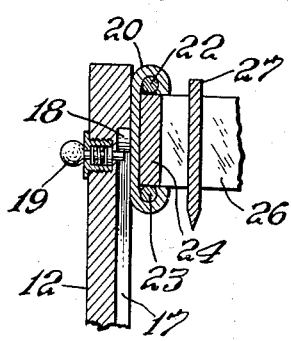

In the drawings:

Fig. 1 is a perspective veiw of an apparatus for first cutting the fruit into parallel sections transversely to the longitudinal axis thereof to define slices, Fig. 2 is an enlarged vertical fragmentary sectional view taken on line 2—2 of Fig. 1.

Figure 3:
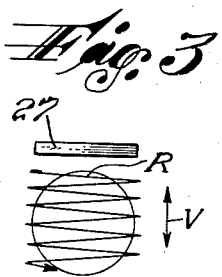
Figure 4:
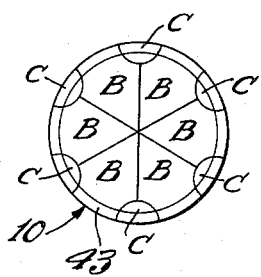

Fig. 3 is a schematic view showing the manner in which the fruit is initially cut into parallel sections transversely of the longitudinal axis thereof, Fig. 4 is a top plan view of one of the thus sliced portions of the fruit which has been further cut as indicated in Figs. 1 and 3 to the triangular form of the body portion of the ultimate product shown in Figs. 7 and 8, Fig. 5 is a perspective view of an apparatus for cutting of the parallel slices of fruit into the form shown in Fig. 4, Fig. 6 is a perspective view of two blades which may be utilized as shown in Fig. 5 for cutting two legs of the triangles of the cut body portions shown in Figs. 4 and 7, Fig. 7 is a perspective view of the cut body portion of a fruit formed as described above, Fig. 8 is a similar view, showing a handle inserted through the rind, adjacent white meat, and into the useful red meat portion of said product, Fig. 9 is a schematic view showing the Fig. 8 product inserted into a bag disposed on an air evacuating apparatus to collapse the bag onto the finished product as shown in Fig. 10, and Fig. 10 illustrates the manner in which the open end of the bag is twisted around the handle after evacuation of the air therefrom, and secured thereto in its twisted position.

As shown in the drawings, the method of this invention is designed to cut a fruit, as for example, watermelon, from its original form into parallel sections (10, Fig. 5) transversely of its longitudinal axis L. This end is attained by suitable cutting means, such as shown in Fig. 1 to comprise four upstanding standards (12–15, Fig. 1) secured to a suitable support 16. Each standard is provided with a vertically slotted portion 17 to slidably receive roller keys 18 one for each slot. Said keys extend from two longitudinal channels 20, 21 which are of generally C-shaped cross-section as shown in Fig. 2, and are disposed adjacent the ends of said channels. The channels have anti-friction means 22, 23 to slidably receive the side bars 24, 25 of the rectangular frame 26 which is thus both slidably disposed within the longitudinal channels. Thus the frame may be reciprocated therein in a generally horizontal direction as indicated by the arrow H in Fig. 1, and may also be vertically reciprocated as indicated by the arrow V in Figs. 1 and 3. Suitable means, such as latch members 19 may be provided to normally hold the longitudinal channel members 20, 21 at their uppermost positions in the standards 12–15. A plurality of cutting knives 27 are disposed in spaced parallel relation within the frame 26 parallel to the side bars 24, 25 of said frame; suitable handle means 28 may be secured to the opposite ends of said frame, to facilitate manipulation thereof. The frame, it will be understood, is at all times slidably disposed within the longitudinal channels 20, 21, and may, by manipulation of the handles 28, be withdrawn to the desired extent therefrom in the direction of the arrow H.

The watermelon is initially placed within the rectangle defined by the standards 12–15 and beneath the frame 26; latch members 19 are rotated clear of slots 17 to permit the frame to be reciprocated in the direction of the arrow V downwardly against the watermelon. It is found, in practice, that not more than a very slight amount of pressure need be exerted to effect the slicing through of the watermelon; the weight of the frame 26 and knives 27 will considerably assist in initially breaking the rind of the melon. The operator moves the frame 26 downwardly and then reciprocates the same in a continuing downward direction along the lines indicated schematically by the arrow R in Fig. 3, until the melon has been cut through. In practice, the cutting of the melon in this fashion into parallel sections is a relatively simple and rapid operataion. The melon having been thus cut, the end pieces would normally be discarded and the sliced watermelon would then be turned up on end in the manner illustrated in Fig. 5 and disposed on the table 41 at right angles to the normal longitudinal axis of the melon. A plurality of blades 30, 31, are secured in a frame 40 to define open V's in any suitable manner, as for example by fixing the ends 30a, 31a thereof, Fig. 6 directly to said frame 40 and adjustably disposing third blades 32 in the frame as by means 42. The blade 32 has a short flat base portion 32a from which the arcuate ends 32b extend upwardly and outwardly so as to abut the blades 30, 31 and to thereby define therewith a generally triangular outline so that when the frame 40 is brought down onto the stack of watermelon slices positioned on table 41, it will cut therefrom the triangularly formed body portions B shown in Figs. 4 and 7. The blade 32 is fixed to the bar 33 which is movably disposed in an aperture in the frame 40 and is adjustable in said aperture as by means 42 so as to dispose the blade 32 in predetermined relation to the other blades 30, 31 (arched ends 32b sliding on blades 31, 32) thereby predetermining the final outline of the piece of watermelon B to be cut. Thus it is possible to adjust the size of the watermelon slices to be cut.

Pursuant to the invention, the operator will adjust the knives so that the knife 32 will, when the frame 40 is moved downwardly, be disposed just outside the rind part 43 of the watermelon slices 44, while the arched ends 32b of the blade 32 will cut through the rind 43 and partly through the adjacent white portion 45, cutting away the parts C shown in dotted lines in Fig. 7 and in full in Fig. 4. The blades 30, 31 are preferably disposed in crossing relationship within the frame so as to essentially duplicate the arrangement of said blades as the two legs of triangles at opposite sides of frame 40. By the arrangement shown in Fig. 6 it will be apparent that four triangular pieces will be cut from each slice 44 of the watermelon. The number of pieces so cut may be increased by the insertion of further blade units corresponding with blades 30, 31, as for example is indicated by the third blade unit 46 shown in Fig. 5 to provide six pieces in a single cutting of the slice 44 (Fig. 4). It will be appreciated that one blade 32 is provided for each section into which the blades 30, 31 divides the frame.

The frame 40 may be reciprocated relative to the table 41 by any suitable means, as for example by securing one or more racks to one end of said frame and passing the other ends of said racks through suitable openings in the table 41 by any suitable means, as for example by securing one or more racks to one end of said frame and passing the other ends of said racks through suitable openings in the table 41 and providing pinions, such as indicated 48 in Fig. 5 to mesh with said racks. In the case of the use of two racks 47, they may be actuated from a single shaft by securing two pinons to mesh with said racks to a single shaft 49 which in turn would have a handle 50 keyed thereto. If desired, stabilizing standards 51 may be keyed to one end to the frame 40 and passed freely through open journals 57 in said table.

A piece of watermelon cut by the method above described will have an essentially large triangular body portion B having the rind portion 43 in its natural position, strengthening the same (Fig. 7). A handle 52 may be passed through the rind part 43 and partly into the body B as shown in Fig. 8. Then the completed article may be inserted into a bag 53 and the open end 55 of said bag may be disposed against or around an evacuating nozzle 54 to thereby evacuate the air from said bag through the open end thereof. The free end of the bag may be then twisted around the handle 52 and the bag closed on the handle (with the free end of the bag twisted therearound) by a ring or staple 56, to thereby maintain the bag in essentially evacuated condition. The article may then be placed in a deep freeze unit for the deep freezing operation, and thereafter if desired, removed and placed in a refrigerator unit or made otherwise available for use.

The sections B are of an outline corresponding to that defined by the blades of frame 40 and such outline may be altered by correspondingly altering the relative arrangement of the blades; the trinagular form appears preferable for many reasons.

Having thus described my invention, what I claim as new and desire to secure by Letters Patent is:

1. The method of forming a deep freeze fruit product of a fruit having a hard outer rind and a soft continuous inner meat body portion completely encircled by said rind, said method comprising the steps of first cutting the fruit into a slice transversely of the longitudinal axis of said fruit, positioning the slice on a support in parallel contact with said support, then moving blades defining an open triangular outline downwardly through the slice to cut the same into a finished piece of conforming outline, inserting a handle into the said finished piece, inserting said finished piece through the open end of a bag of greater length than the finished piece, evacuating the air in said bag through said open end, closing said open end of the bag, and placing said bag containing said piece in a deep freezer to deep freeze said piece in said bag.

2. In a method set forth in claim 1, the further step of evacuating the air in said bag through said open end of the bag after inserting the finished piece therein and before placing said bag in said deep freezer.

References Cited in the file of this patent

UNITED STATES PATENTS

| | | |
|---|---|---|
| 951,241 | Hampel | Mar. 8, 1910 |
| 1,040,582 | Royer et al. | Oct. 8, 1912 |
| 1,656,415 | Breitkrentz | Jan. 17, 1928 |
| 1,706,491 | Jenkins | Mar. 26, 1929 |
| 2,364,049 | Bensel | Dec. 5, 1944 |
| 2,383,814 | Richardson | Aug. 28, 1945 |
| 2,521,995 | Priddy | Sept. 12, 1950 |
| 2,597,067 | Chase | May 20, 1952 |
| 2,621,691 | Brualdi | Dec. 16, 1952 |
| 2,661,039 | Davis et al. | Dec. 1, 1953 |
| 2,662,824 | Talbert | Dec. 15, 1953 |